United States Patent [19]

Gallottini

[11] 4,285,815

[45] Aug. 25, 1981

[54] VACUUM FILTER BELT APPARATUS

[75] Inventor: Emilio Gallottini, Lodi Milano, Italy

[73] Assignee: Esmil B.V., Amsterdam, Netherlands

[21] Appl. No.: 84,142

[22] Filed: Oct. 12, 1979

[30] Foreign Application Priority Data

Oct. 20, 1978 [NL] Netherlands ............... 7810506

[51] Int. Cl.³ ........................................... B01D 33/04
[52] U.S. Cl. ................................. 210/400; 210/406
[58] Field of Search ............... 210/77, 400, 401, 406

[56] References Cited

U.S. PATENT DOCUMENTS

| | | | |
|---|---|---|---|
| 2,094,350 | 9/1937 | Cartigny | 210/401 |
| 2,314,294 | 3/1943 | Wallny | 210/401 |
| 2,377,252 | 5/1945 | Lehrecke | 210/401 |
| 2,549,729 | 4/1951 | Wallny | 210/401 |
| 2,873,028 | 2/1959 | Bried | 210/401 |
| 3,104,223 | 9/1963 | Kasuya | 210/400 |
| 3,105,817 | 10/1963 | Seibert | 210/401 |
| 3,477,583 | 11/1969 | Krynski et al. | 210/401 |
| 3,849,313 | 11/1974 | Lopker | 210/400 |

FOREIGN PATENT DOCUMENTS

| | | | |
|---|---|---|---|
| 795622 | 10/1968 | Canada | 210/400 |
| 848798 | 9/1952 | Fed. Rep. of Germany . | |
| 2900774 | 7/1979 | Fed. Rep. of Germany | 210/400 |
| 2053700 | 4/1971 | France . | |
| 46-14195 | 4/1971 | Japan | 210/400 |
| 633041 | 12/1949 | United Kingdom | 210/400 |
| 1272779 | 5/1972 | United Kingdom | 210/400 |
| 2011797 | 7/1979 | United Kingdom | 210/401 |

*Primary Examiner*—Robert H. Spitzer
*Attorney, Agent, or Firm*—Stevens, Davis, Miller & Mosher

[57] ABSTRACT

Vacuum filter belt apparatus has a continuous belt with an upper run at which suction filtering occurs, via passages which pass through a central thicker portion of the belt and open into a vacuum chamber. To avoid high frictional contact between the belt and the upper side of the vacuum chamber, the thick central portion of the belt passes right through the vacuum chamber from above to below and is supported below the chamber e.g. by rollers or a pressurized chamber.

9 Claims, 6 Drawing Figures

VACUUM FILTER BELT APPARATUS

BACKGROUND OF THE INVENTION

1. Field of the Invention

The invention relates to a vacuum filter belt apparatus.

2. Description of the Prior Art

Typically, such apparatus has an endless belt of elastic material with a concave transverse section, guiding means provided with a drive system for moving the belt along a path having a horizontal operative path portion, fixed supports for supporting and guiding the belt along the operative path portion and a vacuum chamber extending beneath the middle of the belt along operative path portion. Passages in a thick or enlarged portion along the middle of the belt connect via a central slot in the upper surface of the vacuum chamber to the vacuum chamber, so that suction is applied to the upper surface of the belt and the belt makes an airtight seal against the vacuum chamber.

Vacuum filters are widely used industrially for washing or lixiviating slurry mixtures. A typical example of this is the production of $H_3PO_4$ from a mixture of phosphate-bearing rock and sulphuric acid. The slurry formed from this reaction consists of gypsum and phosphoric acid, with the phosphoric acid being concentrated and separated from the gypsum by means of the vacuum filter. This is a procedure which is known and need not be explained further, and which is moreover mentioned only as one possible application of vacuum filter installations in general. Vacuum filter belts are themselves an improvement on the so-called pan filters which consist of a series of separate pans each of which is connected to a vacuum installation and which are conveyed around a horizontal circular track like a caroussel. The pans, are fitted with a filter and, in turn, are filled, have suction applied to them, are flushed and are emptied by tilting.

Compared with pan filters, the vacuum filter belt is an improvement since it does not necessitate periodic tilting movements of the pans and consequently runs more regularly and is simpler to design. Further, the filter is more accessible and the undesirable consequences of deposits within the filter are also less serious. The elastic belt is provided on its upper side with ribs and grooves on which a filter cloth can be laid. This filter cloth, which is also continuous, rests in the operative path portion of the belt on the ribs on the upper surface of the belt but is moved round separately outside this path portion allowing the filtered cloth to be easily cleaned and any solid deposits to be removed from the belt.

The belt's own weight presses it against the fixed supports so that the belt is guided along a fixed path. In known vacuum filter belts, the belt lies over the full width of its thick central portion on a fixed flange on the upper side of the vacuum chamber. The total force with which the belt is pressed against the vacuum chamber is proportional to the degree of the vacuum within the chamber, the width of the thick portion of the belt and the length of the chamber. This means that the belt is forcefully sucked against the vacuum chamber with considerable force. Even if materials with a low coefficient of friction are used, the total friction between the belt and the vacuum chamber still requires an appreciable force to be used to drive the belt. On the one hand, this means that an expensive drive system is necessary, and on the other hand that the belt itself must be of an especially heavy and strong design for this purpose. It should be noted that the friction between the belt and the guiding supports also contributes substantially to the total traction force required for the belt, but it has been found that this may be reduced by applying liquid or air lubrication between the belt and the supports. Since the contact surface between the thick portion of the belt and the vacuum chamber must also serve as an airtight seal, it has in fact proved difficult to use water or air lubrication in this case.

SUMMARY OF THE INVENTION

The object of the invention is to reduce the friction between the belt and the vacuum chamber appreciably, thereby making possible the use of a lighter belt and a simpler drive system. Another important factor is that when friction is reduced between the belt and the vacuum chamber, less wear occurs in the belt, so that its life is extended.

According to the invention there is provided a vacuum filter belt apparatus comprising a continuous belt movable by driving means along a continuous path which includes an operative path portion at which the upper face of the belt is concave, the belt having a relatively thick central portion which is sealed to at least one vacuum chamber located below the belt at said operative path portion and having a slot in its upper side, there being passages extending through the belt to communicate the upper surface of the belt with the vacuum chamber, whereby suction filtering of material on the belt is effected. This apparatus is characterized in that the vacuum chamber has a slot in its lower side beneath said slot in its upper side and that the said thick central portion of the belt extends through both said slots to beneath the vacuum chamber, there being seals provided at both said slots to seal the vacuum chamber and there being support means for the said thick central portion beneath the vacuum chamber.

For the support means, mechanical means, such as e.g. rollers, are possible. It should be noted that it is also conceivable for rollers to be fitted in the vacuum chamber, in which case it is unnecessary for the thick portion of the belt to extend to beneath the vacuum chamber and the slot in the lower side of the vacuum chamber can be omitted. This design is considered less favourable on account of the difficulty of access to the rollers for maintanence and the difficult conditions under which the rollers are put to work (vacuum, filtered liquid).

Preferably, however, the support means for the thick central portion of the belt is a pressure equalization chamber which receives the lower side of said thick central portion of the belt and is arranged to apply fluid pressure to the undersurface of said thick central portion.

The pressure equalization chamber may have a slot in its upper side coincident with the second slot of the vacuum chamber. The width of the slot in the upper side of the vacuum chamber and the width of the slot in the pressure equalization chamber and means for adjusting the pressure in the pressure equalisation chamber may be so selected and adapted that the force on the filter belt as a result of the vacuum can be at least compensated by the pressure in the pressure equalisation chamber. It should be noted that the pressure equalisation chamber may be an open space if the pressure in it is to be atmospheric pressure.

In this way, direct friction between the thick central portion of the filter belt and a fixed flange on the upper side of the vacuum chamber, such as occurs in known examples of vacuum filter belt apparatus, is avoided and part of the weight of the filter belt, filter cloth and material being filtered can even be compensated for, so that friction between the filter belt and its lateral supports is reduced.

In the invention the thick central portion on the one hand and the edges of the slots in the vacuum chamber and pressure equalisation chamber on the other must form a suitable seal against each other in order to prevent air leakage to the vacuum chamber. Resilient or elastic seals are preferred.

It is conceivable for the thick central portion of the filter belt to be sealed by elastic seals directly against the material from which the vacuum chamber and the pressure equalisation chamber are made. Because of the desired rigidity of the two chambers under the prevailing vacuum and a possibly prevailing over-pressure in the pressure equalisation chamber, the chambers should preferably be made of metal. An arrangement in which the thick central portion seals against metal by elastic seals is unfavourable, and preference should therefore be given to providing the slots in the two chambers with strip-type sealing material with good running qualities such as e.g. teflon, it being possible to fasten the sealing strips to the chambers adjustably. It is also conceivable for the elastic sealing means to form part of the thick central portion of the filter belt or to form part of the sealing strips fastened to the chambers.

One suitable sealing arrangement is where the sides of the thick central belt portion are provided with elastic lips which make airtight seals against smooth sealing strips. With this arrangement, the elastic lips rub against the sealing strips but this force can be reduced to a very low value by appropriately selecting the shape and dimensions of the elastic lips and the combination of materials for the elastic lips and sealing strips.

Finally, it is conceivable that the thick central portion is in one piece with the filter belt. Although the above-described characteristics of the invention can sharply reduce the wear and tear on this portion, some wear still occurs at its elastic lips. It has been found that preference should therefore be given to forming the thick central portion as a detachable element of the filter belt. The result is that, when the detachable element is worn out, the entire filter belt need not be expensively replaced but merely a new element need be fitted.

BRIEF DESCRIPTION OF THE DRAWINGS

Embodiments of the invention will now be described by way of example with reference to the accompanying drawings, in which.

DESCRIPTION OF THE PREFERRED EMBODIMENTS

Figure 1:
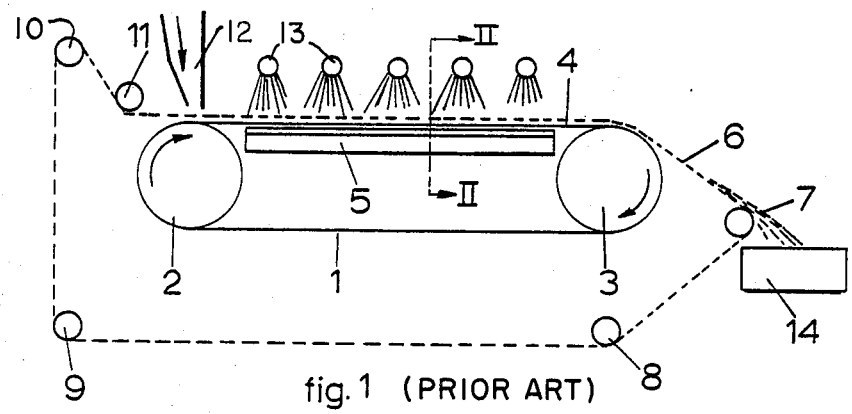
FIG. 1 shows in diagrammatic form a longitudinal view of a vacuum filter belt installation.

FIG. 1 shows an endless belt 1 consisting of rubber reinforced with canvas. In this embodiment, this belt is about 2.5 m wide and up to 60 m in length. The belt is guided over rollers 2 and 3 of which at least one is driven by a drive mechanism (not shown). A vacuum chamber 5, which can be connected up to a vacuum pump at several points, is located beneath the top horizontal run 4 of the belt 1. This run forms the operative portion of the endless path travelled by the belt. A filter cloth 6 is tensioned and moved by rollers 7 to 11 so that between the rollers 2 and 3 on the belt 1 it follows the same path 4 as the belt 1.

Slurry material to be treated is conveyed onto the filter cloth 6 via a feed chamber 12 and may then be dampened by a number of spray jets 13, which are selected according to the desired process, with such fluids as are necessary. After filtering, the lixiviated sludge on the filter cloth is deposited by the guide roller 7 in the collecting box 14. During the further movement of the belt 1 and filter cloth 6, both may be cleaned of caked components as required.

Figure 2:
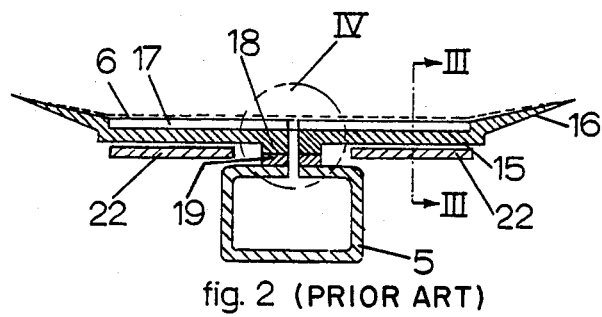
FIG. 2 shows a detail in cross-section on an enlarged scale on the line II—II in FIG. 1, showing a conventional construction.

FIG. 2 shows the shape of the belt 1 in the known apparatus described above more precisely. It will be clear that this shape is only one possible type and that several essentially equivalent shapes are possible and known. The belt consists chiefly of a middle section 15, equipped at the edges with raised flanges 16. Ribs 17 are formed on the middle section 15 transversely to the movement direction of the belt.

Figure 3:
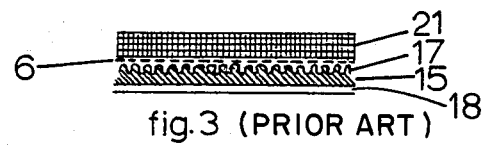
FIG. 3 is a cross-section on the line III—III in FIG. 2.

FIG. 3 shows the ribs 17 on which the web 21 of the filter cloth 6 lies. Fluid that has seeped through the filter cloth is caught in the spaces between the ribs 17 and removed centrally to the vacuum chamber 5. A thickened central portion 18 in the centre part 15 of the belt 1 is also shown in FIGS. 2 and 3, this portion 18 sliding along the flanges 19 at the upper side of the vacuum chamber 5. The pressure difference between the vacuum chamber and the atmosphere determines the force by which the portion 18 is pressed against the flanges 19 and consequently the tractive effort necessary to overcome this friction.

Figure 4:
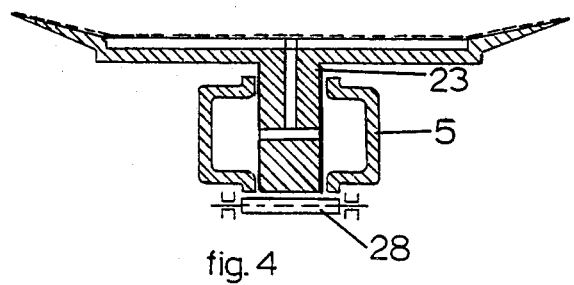
FIG. 4 shows the detail IV of FIG. 2, but now modified according to one form of the invention.

In the embodiment of the invention shown in FIG. 4, the shape of the belt and filter cloth is the same as in FIG. 3, except that the central thickened belt portion (which corresponds to the portion 18 of FIG. 2) is yet thicker or deeper. Instead of the flanges 19 in FIG. 2 support means for the central portion 23 are provided beneath the vacuum chamber 5, and are shown by way of example, in the form of rollers 28. The horizontal slot in the upper side of the vacuum chamber 5 is wider than in the known example of FIG. 2. There is similarly a horizontal slot in the under side of the vacuum chamber 5 lying directly beneath the slot in the upper surface. The thickened portion 23 contains passages connected to the vacuum chamber, and is sealed by elastic means (not shown) to the walls of the slots in the upper surface and lower surface of the vacuum chamber.

Figure 5:
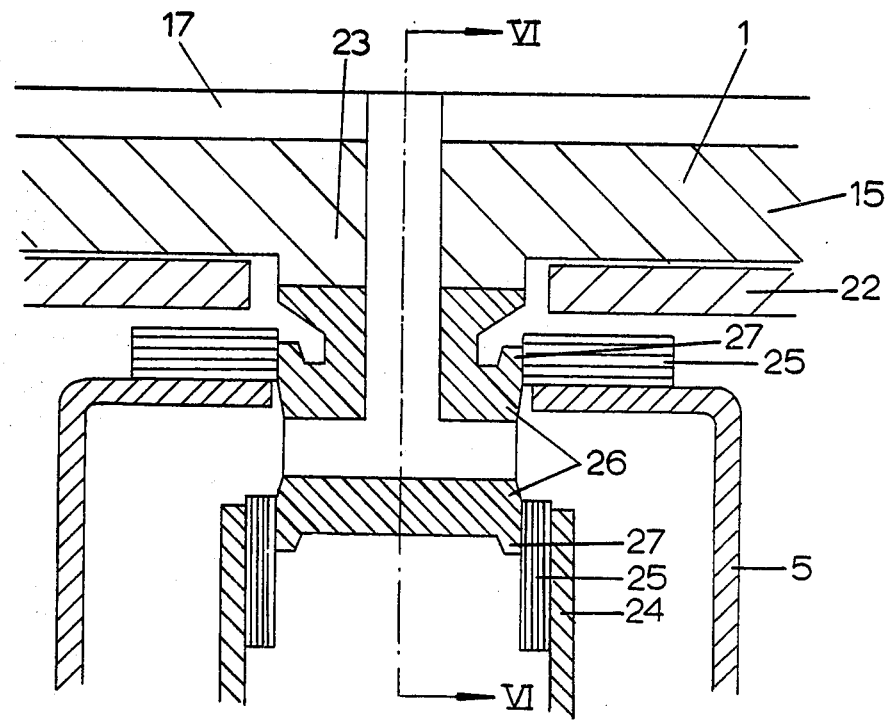
FIG. 5 shows the detail along IV in FIG. 2, on an enlarged scale in a second and preferred embodiment of the invention.

FIG. 5 shows a preferred embodiment of the invention. Here is can be seen how the supporting plates 22 which are present in the known construction of FIG. 2 and in the embodiment of the invention in FIG. 4 (but which are not shown in FIGS. 1 and 4) extend to close to the thickened belt portion 23. Instead of the supports 28 shown in FIG. 4, a pressure equalisation chamber 24 is fitted beneath the vacuum chamber 5. There is a horizontal slot in the upper surface of the chamber 24, this slot also forming the lower slot of the vacuum chamber 5 and lying beneath the slot in the vacuum chamber 5. Sealing strips 25 of Teflon, nylon or any other suitable material with a low co-efficient of friction are fastened to the edges of the slots of both chambers. The thickened portion 23 of the filter belt 1 fills the horizontal slots in the vacuum chamber 5 and the pressure equalisation chamber 24. At the sealing strip 5, the portion 23 is provided with elastic lips 27. The shape and dimensions of the lips 27 and the material of the raised edge 23 and strips 25 are so selected, partly in dependence on the under-pressure prevailing in the vacuum chamber, that during operation the lips 27 press against the strip 25 with just sufficient force to keep air leakage along these lips relatively low during operation. It has been found that with the aid of this assembly, air leakage to the vacuum chamber can be kept very low while the tractive effort required in the belt 1 can be lowered appreciably.

Means (not shown) are provided for supplying fluid, preferably air, under predetermined pressure to the pressure equalisation chamber 24. This pressurized fluid acts on the under side of the thick central belt portion 23 to provide support for this portion. This support can be such as at least partly to counteract the downward force exerted by the underpressure of the vacuum chamber (though this downward force is much reduced compared with the prior art arrangement where the undersurface of the thick belt portion is at least partly exposed to the vacuum). Atmospheric pressure in the chamber 24 may be sufficient, in which case this chamber is merely open to the atmosphere, but preferably an overpressure is applied, and this may be sufficient to support the belt partially relieving the load on the supports 22.

Figure 6:
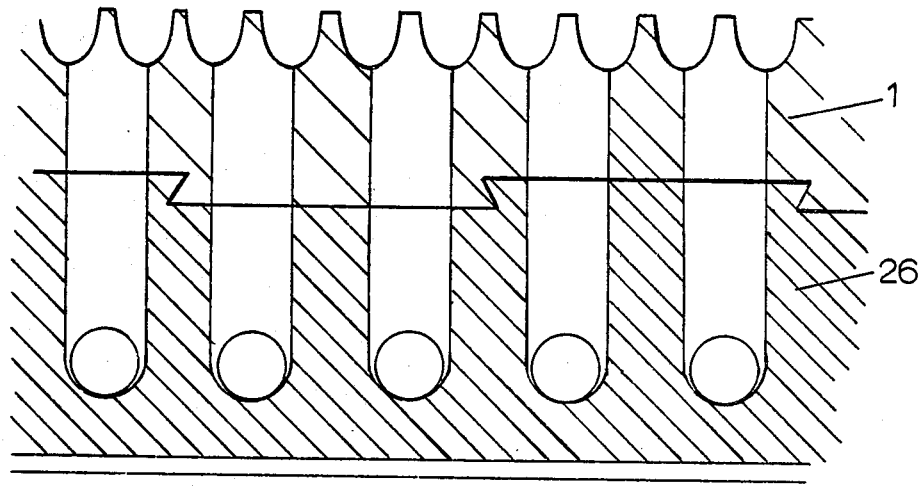
FIG. 6 shows a cross-section on the line VI—VI in FIG. 5, on an enlarged scale.

The thick belt portion 23 can be in one-piece with the filter belt 1. In FIGS. 5 and 6, however, it takes the form of a detachable element 26. By designing the contact surface of the element 26 to the belt 1 in the shape of a dove-tail (FIG. 6) these elements can be secured to each other in a detachable and elastically adhering manner. In this way, each can be easily mounted and dismounted. The result is that the whole filter belt need not be replaced when the portion of the filter belt which is subject to the heaviest wear has worn out.

It should be noted that friction between the belt 1 and the supporting plates 22 can be reduced in a way, which is in itself known by applying a lubricant film of either water or air between the belt 1 and the supporting plates 22.

Although the invention has been illustrated above by means of preferred embodiments, it is to be understood that many variations and modification within the principle of the invention are possible.

What is claimed is:

1. In a vacuum filter belt apparatus comprising a continuous belt movable by driving means along a continuous path which includes an operative path portion at which the upper face of the belt is concave, the belt having a relatively thick central portion which is sealed to at least one vacuum chamber located below the belt at said operative path portion and having a slot in its upper side, there being passages extending from the upper surface of the belt through the relatively thick central portion of the belt to within the vacuum chamber to communicate the upper surface of the belt with the vacuum chamber, whereby suction filtering of material on the belt is effected, the improvement that the vacuum chamber has a slot in its lower side beneath said slot in its upper side and that the said thick central portion of the belt extends through both said slots to beneath the vacuum chamber, there being seals provided at both said slots to seal the vacuum chamber and there being support means for the said thick central portion beneath the vacuum chamber.

2. A vacuum filter belt apparatus according to claim 1 wherein the said seals between the slots in the vacuum chamber and the thick central portion of the belt are provided by resilient sealing members.

3. A vacuum filter belt apparatus according to claim 1 wherein said support means for the thick central portion of the belt is a pressure equalization chamber which receives the lower side of said thick central portion of the belt and is arranged to apply fluid pressure to the undersurface of said thick central portion.

4. A vacuum filter belt apparatus according to claim 3 wherein the pressure equalization chamber has a slot in its upper side which corresponds to the slot in the lower side of the vacuum chamber and receives said thick central portion of the belt, the width of the slot in the upper side of the vacuum chamber, the width of the slot in the upper side of the pressure equalization chamber and means provided for adjusting the pressure in the pressure equalisation chamber are so selected and adapted that the force on the filter belt consequent upon the vacuum can be at least compensated by the pressure in the pressure equalization chamber.

5. A vacuum filter belt apparatus according to claim 4 wherein the slots of the vacuum chamber and pressure equalization chamber have sealing strips fastened to the chambers.

6. A vacuum filter belt apparatus according to claim 3 or claim 4 wherein the said thick central portion of the belt carries resilient lips on its sides by which it is sealed to the vacuum chamber and the pressure equalisation chamber.

7. A vacuum filter belt apparatus according to any one of claims 1, 2 and 3 wherein the said thick central portion of the belt is at least partly formed as an element replaceably detachable from the remainder of the belt.

8. Vacuum filter belt apparatus comprising
 a continuous belt of resilient material having, at one side, a concave face,
 belt guide means and drive means for moving the belt in a continuous path including an operative path portion at which said concave face of the belt is facing upwards,
 at least one vacuum chamber located beneath said operative path portion and having a first slot in its upper side and a second slot in its lower side beneath said first slot, both slots extending longitudinally in the direction of travel of the belt in said operative path portion,
 a relatively thick central portion of said belt extending downwardly through both said first and second slots at said operative path portion and being sealed to the vacuum chamber at both said slots,
 a plurality of passages extending through said thick central portion of the belt from the said concave surface of the belt and opening into the vacuum chamber at said operative path portion whereby suction is applied at said concave surface,
 and support means for said thick central portion of the belt beneath said second slot of the vacuum chamber.

9. A vacuum filter belt apparatus according to claim 8 wherein said support means comprises a pressurisable chamber having a slot to receive said thick central belt portion corresponding to said second slot of the vacuum chamber, the pressurizable chamber having fluid pressure applying means whereby pressure in the chamber exerts support on the underside of said thick central belt portion.

* * * * *